US011358290B2

(12) United States Patent
Yamada et al.

(10) Patent No.: US 11,358,290 B2
(45) Date of Patent: Jun. 14, 2022

(54) CONTROL APPARATUS, ROBOT SYSTEM, METHOD FOR OPERATING CONTROL APPARATUS, AND STORAGE MEDIUM

(71) Applicant: CANON KABUSHIKI KAISHA, Tokyo (JP)

(72) Inventors: Takayuki Yamada, Kawasaki (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 16/163,745

(22) Filed: Oct. 18, 2018

(65) Prior Publication Data
US 2019/0118394 A1 Apr. 25, 2019

(30) Foreign Application Priority Data

Oct. 19, 2017 (JP) .............................. JP2017-202858
Sep. 27, 2018 (JP) .............................. JP2018-182701

(51) Int. Cl.
B25J 9/00 (2006.01)
B25J 19/02 (2006.01)
B25J 9/16 (2006.01)
G06V 10/20 (2022.01)
G06V 20/20 (2022.01)

(52) U.S. Cl.
CPC ............... B25J 19/023 (2013.01); B25J 9/16 (2013.01); B25J 9/1697 (2013.01); G06V 10/255 (2022.01); G06V 20/20 (2022.01); G05B 2219/40584 (2013.01); G05B 2219/40609 (2013.01); G06V 2201/06 (2022.01)

(58) Field of Classification Search
CPC .......... B25J 19/023; B25J 9/1697; B25J 9/16; G06K 9/3241; G06K 9/00671; G06K 2209/19; G05B 2219/40609
See application file for complete search history.

(56) References Cited

U.S. PATENT DOCUMENTS

| | | |
|---|---|---|
| 4,886,943 A | 12/1989 | Suzuki et al. |
| 4,887,245 A | 12/1989 | Mori et al. |
| 4,910,363 A | 3/1990 | Kobayashi et al. |
| 4,931,965 A | 6/1990 | Kaneko et al. |
| 4,980,518 A | 12/1990 | Kobayashi et al. |
| 5,070,325 A | 12/1991 | Tanaka et al. |
| 5,097,102 A | 3/1992 | Yoshimura et al. |

(Continued)

FOREIGN PATENT DOCUMENTS

JP 2015-085450 A 5/2015

*Primary Examiner* — Ian Jen
(74) *Attorney, Agent, or Firm* — Venable LLP

(57) ABSTRACT

A control apparatus, comprising: an image obtaining unit configured to obtain an image in which a control target that a robot controls and a target position to which the control target is to be moved are imaged by an imaging apparatus that is attached to the robot; an axial direction obtainment unit configured to obtain an axial direction of a rotational axis of the control target; a target position detection unit configured to detect the target position in the image; an operation generation unit configured to generate an operation for the control target so that the target position is present in the axial direction and to further generate an operation by which the control target becomes closer to the target position in the axial direction; and a control unit configured to control the control target in accordance with the operation.

14 Claims, 12 Drawing Sheets

(56) References Cited

U.S. PATENT DOCUMENTS

| | | | |
|---|---|---|---|
| 5,142,106 A | 8/1992 | Yoshimura et al. | |
| 5,239,138 A | 8/1993 | Kobayashi et al. | |
| 5,500,492 A | 3/1996 | Kobayashi et al. | |
| 5,539,678 A | 7/1996 | Tanaka et al. | |
| 5,565,893 A | 10/1996 | Sato et al. | |
| 5,714,698 A | 2/1998 | Tokioka et al. | |
| 5,726,686 A | 3/1998 | Taniishi et al. | |
| 5,736,979 A | 4/1998 | Kobayashi et al. | |
| 5,805,147 A | 9/1998 | Tokioka et al. | |
| 5,818,429 A | 10/1998 | Tanaka et al. | |
| 5,831,603 A | 11/1998 | Yoshimura et al. | |
| 5,936,207 A | 8/1999 | Kobayashi et al. | |
| 6,415,240 B1 | 7/2002 | Kobayashi et al. | |
| 6,636,199 B2 | 10/2003 | Kobayashi et al. | |
| 6,862,019 B2 | 3/2005 | Kobayashi et al. | |
| 7,075,524 B2 | 7/2006 | Kobayashi et al. | |
| 7,177,459 B1 * | 2/2007 | Watanabe | B25J 9/1697 382/152 |
| 7,424,341 B2 * | 9/2008 | Watanabe | G06T 1/0014 318/568.1 |
| 7,486,281 B2 | 2/2009 | Kobayashi et al. | |
| 7,965,904 B2 | 6/2011 | Kobayashi | |
| 8,095,237 B2 * | 1/2012 | Habibi | B25J 9/1692 700/245 |
| 8,098,928 B2 * | 1/2012 | Ban | G06T 1/0007 382/153 |
| 8,280,551 B2 * | 10/2012 | Tani | B25J 19/023 901/14 |
| 8,666,141 B2 * | 3/2014 | Inazumi | G06T 5/003 382/153 |
| 8,687,057 B2 | 4/2014 | Kobayashi et al. | |
| 8,941,726 B2 * | 1/2015 | Marks | G06T 7/143 348/61 |
| 9,156,162 B2 | 10/2015 | Suzuki et al. | |
| 9,361,695 B2 * | 6/2016 | Rodrigues | G06T 1/0014 |
| 9,393,696 B2 * | 7/2016 | Hayashi | B25J 9/1697 |
| 2005/0065653 A1 * | 3/2005 | Ban | B25J 9/1697 700/245 |
| 2008/0267737 A1 * | 10/2008 | Hatanaka | B25J 9/1687 414/1 |
| 2013/0039541 A1 * | 2/2013 | Inazumi | G06T 5/003 382/103 |
| 2014/0371910 A1 * | 12/2014 | Hayashi | B05C 11/1018 700/259 |
| 2017/0027686 A1 * | 2/2017 | Nagasaka | A61F 2/167 |
| 2018/0243901 A1 * | 8/2018 | Hashimoto | B25J 13/006 |

* cited by examiner

CONTROL APPARATUS, ROBOT SYSTEM, METHOD FOR OPERATING CONTROL APPARATUS, AND STORAGE MEDIUM

BACKGROUND OF THE INVENTION

Field of the Invention

The present invention relates to a control apparatus, a robot system, a method of operating the control apparatus, and storage medium, and in particular, relates to a visual servoing technique for controlling a robot based on an image.

Description of the Related Art

Conventionally, visual servoing is known as one technique for performing control of a robot based on a camera image. Visual servoing is a technique for performing feedback control of a robot such that a target object appears in a desired position. When using visual servoing, there is no need to obtain a position and orientation relationship between a robot and a camera or between the robot and an end effector precisely, and it is possible to reduce the load of a calibration operation for obtaining such positional relationships. Among visual servoing techniques, a method of extracting from an image features of a target to be guided to a target position and a target at a target position, and based on a difference in their positions, controlling a robot, has the advantage of being able to handle positional change of the target to be guided and the target at the target position.

In Japanese Patent Laid-Open No. 2015-85450, it is disclosed that by detecting a feature amount from an image in which a target object to be attached in an assembly and a target object to which to attach in an assembly are imaged, and performing assembly work based on the detection result, assembly work is achieved even in a case where the target object to which to attach is misaligned.

In order to achieve visual servoing using image features, it is necessary to configure to be able to identify position and orientation by imaging a target to be guided to a target position and a target at the target position within the same image and extracting a plurality of their respective features. However, there are cases in which it is only possible to extract a small number of features due to the shape of the objects. Also, there are cases where not enough features can be extracted because only a portion of a target object appears due to the arrangement of the camera.

The present invention was conceived in view of the above described problems, and provides a technique for enabling a task to be executed at high precision by realizing visual servoing even in a case where features cannot be sufficiently extracted from an image.

SUMMARY OF THE INVENTION

According to one aspect of the present invention, there is provided a control apparatus, comprising: an image obtaining unit configured to obtain an image in which a control target that a robot controls and a target position to which the control target is to be moved are imaged by an imaging apparatus that is attached to the robot; an axial direction obtainment unit configured to obtain an axial direction of a rotational axis of the control target; a target position detection unit configured to detect the target position in the image; an operation generation unit configured to generate an operation for the control target so that the target position is present in the axial direction and to further generate an operation by which the control target becomes closer to the target position in the axial direction; and a control unit configured to control the control target in accordance with the operation.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

In the first embodiment, by an imaging apparatus that is attached to a robot, a control target and a target position are imaged, and the control target is guided to the target position by the robot. In the present embodiment, the control target is a screwdriver which is an end effector that is installed on the robot. The target position is a position at which the end effector executes a task, and the center of a screw, which is a position of a single image feature point, is used in the present embodiment. Note that there may be two or more image features for the target position. A robot system that, as a task by the robot, automatically removes a screw by unscrewing the screw using the screwdriver which is the end effector after guidance, will also be described. By generating a robot operation from a positional relationship between the screwdriver and the screw in the image, it is possible to accurately control in a case where there is an error in calibration between the robot and the imaging apparatus and calibration between the imaging apparatus and the end effector.

[Apparatus Configuration]

Figure 1:
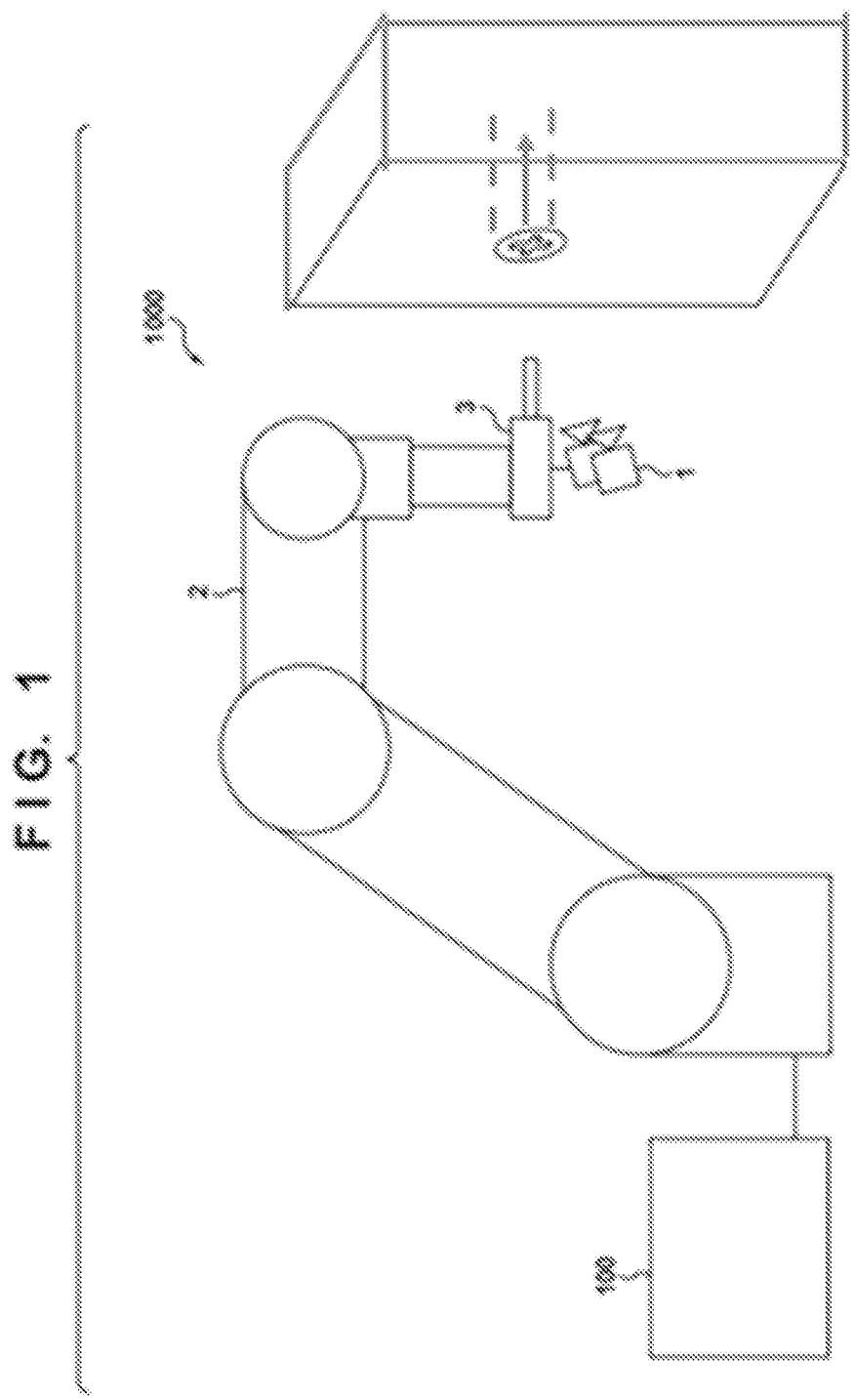
FIG. 1 is a configuration diagram that illustrates an example of a configuration of a robot system of a first embodiment.
Figure 2:
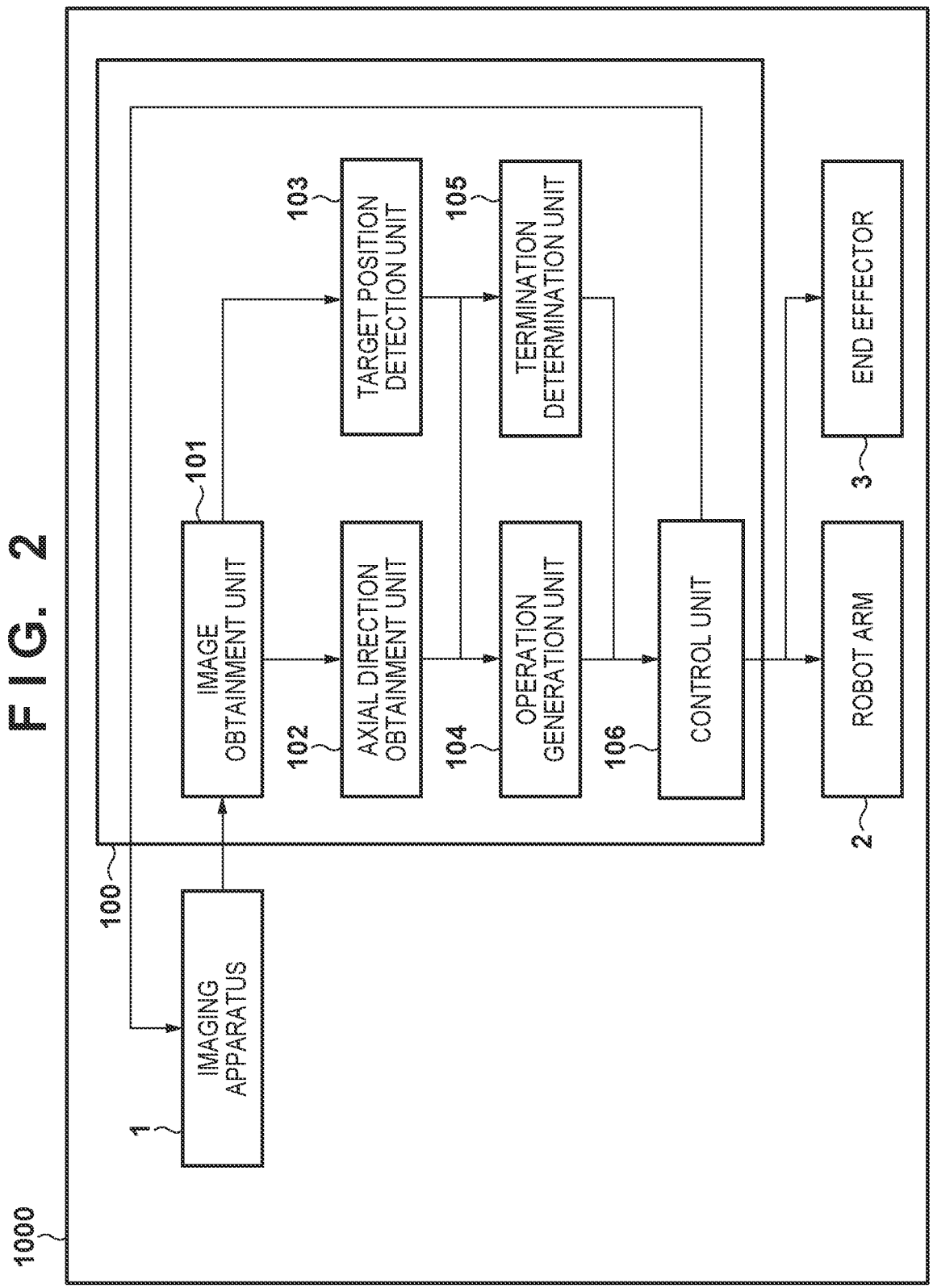
FIG. 2 is a block diagram that illustrates an example of the configuration of the robot system of the first embodiment.

By the configuration diagram of FIG. 1 and the block diagram of FIG. 2, an example of a configuration of a robot system 1000 comprising a control apparatus 100 of the first embodiment is illustrated. The robot system 1000 comprises an imaging apparatus 1, a robot arm 2, an end effector 3, and the control apparatus 100.

The imaging apparatus 1 is attached to the end effector 3, and is an apparatus that images a scene including the end effector 3 and the target position. For example, the imaging apparatus 1 is configured from two grayscale cameras, and performs imaging in accordance with an imaging trigger from a control unit 106, and sends an image signal to an image obtainment unit 101.

The robot arm 2 is an apparatus that causes the control target to move. For example, the robot arm 2 is configured by a six-axis robot, and operates when a control value is inputted by the control apparatus 100. The end effector 3 is an apparatus that is attached to a front end of the robot arm and that operates a target. For example, the end effector 3 is configured by a screwdriver and a proximity sensor, and inputs a contact state between a screwdriver and a target to the control apparatus 100. Also, the end effector 3 operates when a control value is inputted by the control apparatus 100.

The control apparatus 100 comprises the image obtainment unit 101, an axial direction obtainment unit 102, a target position detection unit 103, an operation generation unit 104, a termination determination unit 105, and the control unit 106.

The image obtainment unit 101 receives the image signal from the imaging apparatus 1, and sends image data to the axial direction obtainment unit 102 and the target position detection unit 103. For example, the image obtainment unit 101 is configured by a memory.

The axial direction obtainment unit 102 receives image data from the image obtainment unit 101, obtains an axial direction of a control target set by the axial direction setting unit (not shown), and sends axial direction data to the operation generation unit 104 and the termination determination unit 105. Here, axis means a rotational axis, for example, and axial direction means a line segment in an image that is associated with a control target which is for measuring a position and orientation relationship between the control target and the target position, and for example a central axis of the screwdriver which is the end effector 3 is expressed by a two-dimensional point on the axis and a two-dimensional vector that is pointed towards its tip from its root. Note that a vector may conversely be in a direction towards the root from the tip. By setting the axial direction, even in a situation where the end effector 3 is only partially imaged by the imaging apparatus 1 which is attached to the end effector 3 and features of the end effector 3 cannot be sufficiently detected, the operation generation unit 104 can calculate the position and orientation that define the operation of the end portion of the robot arm 2.

The target position detection unit 103 receives image data from the image obtainment unit 101, detects the target position from the image data, and sends target position data to the operation generation unit 104 and the termination determination unit 105. The operation generation unit 104, based on the axial direction data and the target position data received from the axial direction obtainment unit 102 and the target position detection unit 103, calculates the position and orientation that define the operation of the end portion of the robot arm 2, and sends the position and orientation data to the control unit 106. Firstly, so that the target position is on the rotational axis, the end portion of the robot arm 2 is caused to move, and after that, the end portion of the robot arm 2 is caused to reach the target position by movement in the axial direction.

The termination determination unit 105, based on the axial direction data and the target position data received from the axial direction obtainment unit 102 and the target position detection unit 103, determines whether the control target has reached the target position, and sends the termination determination data to the control unit 106.

The control unit 106, based on the position and orientation data received from the operation generation unit 104, controls the robot arm 2. Also, the control unit 106, based on the termination determination data received from the termination determination unit 105, sends an imaging trigger to the imaging apparatus 1 in a case of continuing a control loop, and controls the robot arm 2 and the end effector 3 based on a task operation in a case of terminating the control loop.

[Control Processing]

Figure 3:
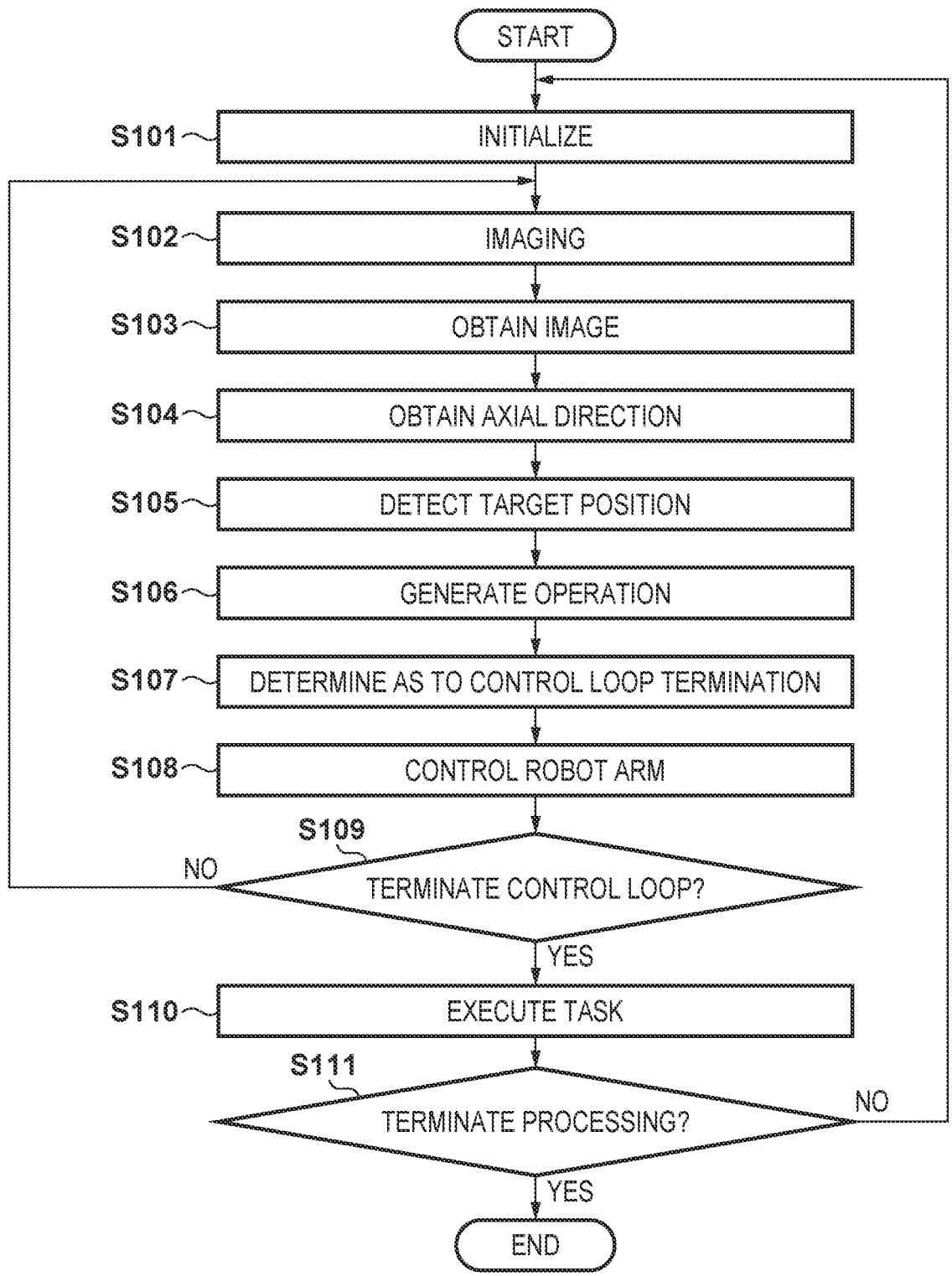
FIG. 3 is a flowchart for describing processing by the robot system of the first embodiment.
Figure 4:
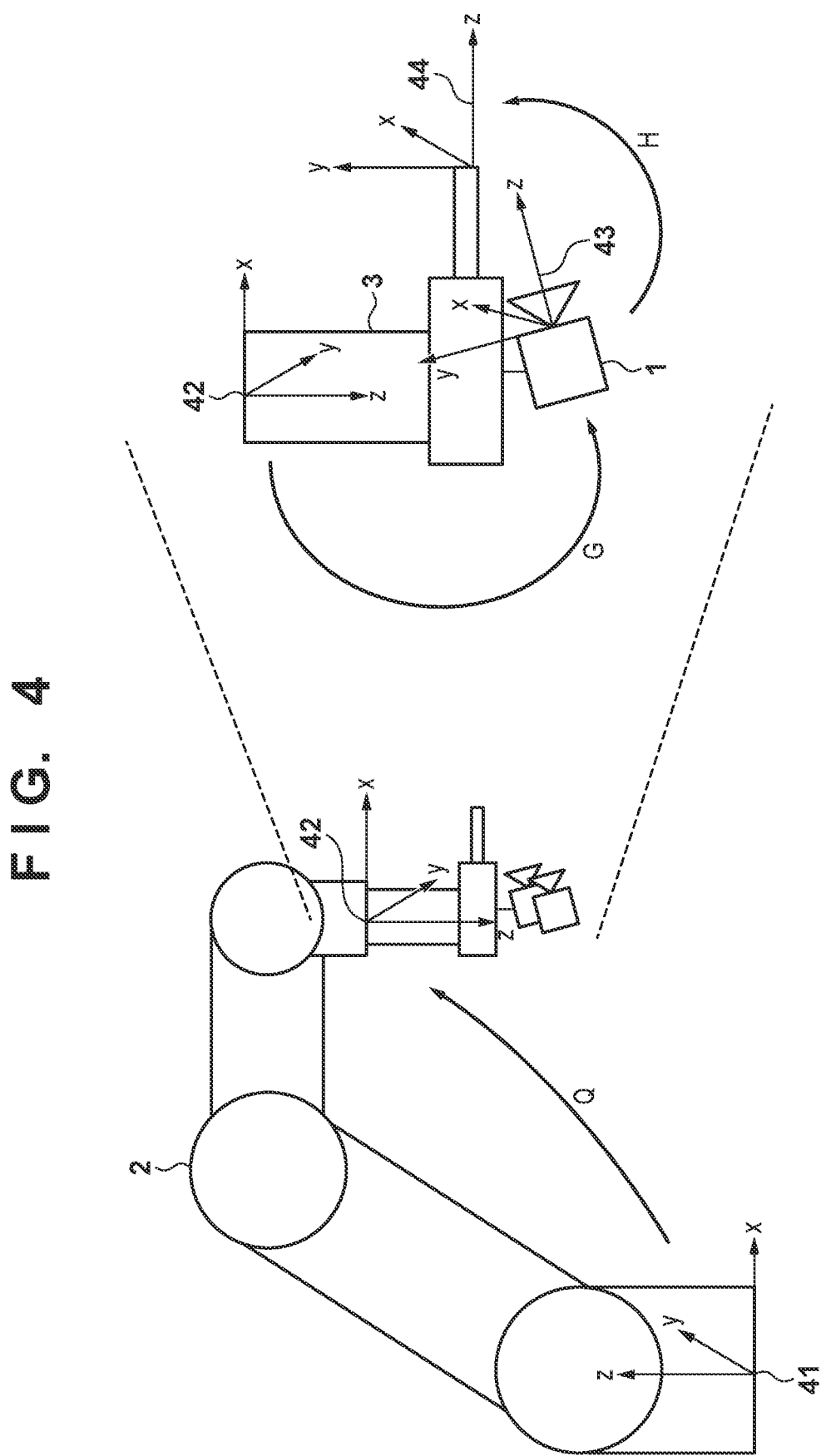
FIG. 4 is a view that illustrates coordinate systems of the robot system of the first embodiment.

A control processing method according to the control apparatus 100 and the robot system 1000 of the first embodiment will be described in accordance with a flowchart of FIG. 3 and a definition of coordinate systems of FIG. 4. Reference numeral 41 of FIG. 4 is a robot coordinate system which is a reference for the robot arm 2, reference numeral 42 is a flange coordinate system corresponding to an end portion of the robot arm 2, reference numeral 43 is an imaging apparatus coordinate system which is a reference for the imaging apparatus 1, and reference numeral 44 is an end effector coordinate system corresponding to an end portion of the end effector 3. Q denotes the flange coordinate system 42 in the robot coordinate system 41 (flange position and orientation), G denotes a transformation matrix for transformation from the flange coordinate system 42 to the imaging apparatus coordinate system 43, and H denotes a transformation matrix for transformation from the imaging apparatus coordinate system 43 to the end effector coordinate system 44.

(Step S101)

In step S101, the control unit 106 controls the robot arm 2 to move to an initial position and orientation. In the present embodiment, the control unit 106 obtains, as an initial position and orientation, a position and orientation set by instruction work by a teaching pendant. Also, the operation generation unit 104 obtains the transformation matrix G and the transformation matrix H. Note that the transformation matrix G and the transformation matrix H are obtained by a user in advance by a design value or a calibration, and they may include an error. When the robot arm 2 moves to the initial position and orientation, the control unit 106 sends an imaging trigger to the imaging apparatus 1.

(Step S102)

In step S102, the imaging apparatus 1 receives the imaging trigger from the control unit 106, performs imaging, and sends the imaged image signal to the image obtainment unit 101.

(Step S103)

In step S103, the image obtainment unit 101 receives the image signal from the imaging apparatus 1, and sends image data to the axial direction obtainment unit 102 and the target position detection unit 103.

(Step S104)

In step S104, the axial direction obtainment unit 102 receives the image data from the image obtainment unit 101, obtains the axial direction of the control target, and sends the obtained axial direction data to the operation generation unit 104 and the termination determination unit 105.

In the present embodiment, two long line segments are detected in the straight line edges of the screwdriver which is the end effector 3 and which appears in the image, a midline therebetween is made to be the axis, and an axial direction is obtained by making the direction from the bottom toward the top of the image positive. The axial direction may be detected from the image as in the present embodiment, and data that is set in advance may be obtained by an axial direction setting unit (not shown). The axial direction setting unit may, after a user designates two points from within the image, for example, set a line segment connecting the two points as the axial direction. Alternatively, the axial direction setting unit may set the axial direction by using a value that is projected in the axial direction of the end effector 3 in the image based on a result of measuring the three-dimensional positional relationship between the imaging apparatus 1 and the end effector 3.

(Step S105)

In step S105, the target position detection unit 103 receives the image data from the image obtainment unit 101, detects the target position based on the image data, and sends the detected target position data to the operation generation unit 104 and the termination determination unit 105.

In the present embodiment, a screw center position is detected as a target position. The detection may be performed by template matching where an image of a screw that is imaged in advance is made to be a template, and it may be performed by extracting the screw region based on luminance values of the image, and calculating its centroid.

(Step S106)

In step S106, the operation generation unit 104 receives the axial direction data and the target position data from the axial direction obtainment unit 102 and the target position detection unit 103, and calculates the position and orientation that define operation of the end portion of the robot arm 2. Also, the operation generation unit 104 sends the calculated position and orientation data to the control unit 106. Firstly, so that the target position is on the rotational axis, the end portion of the robot arm 2 is caused to move, and after that, the end portion of the robot arm 2 is caused to reach the target position by movement in the axial direction.

Figure 5:
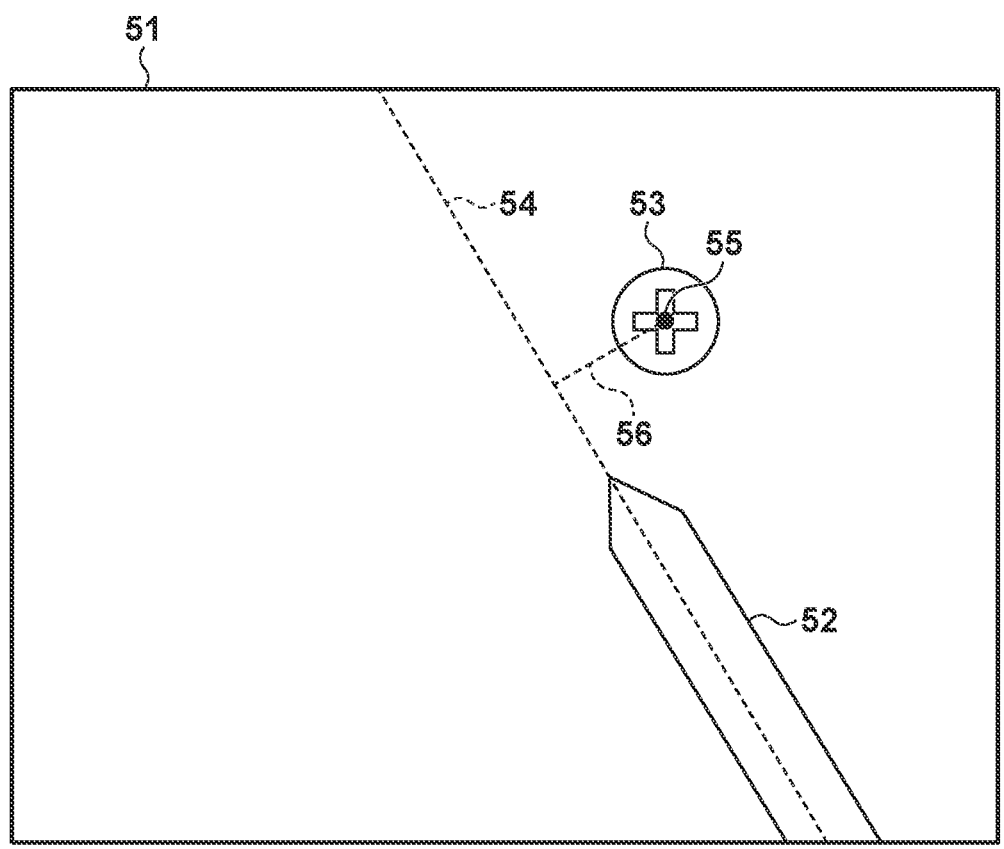
FIG. 5 is a view for describing an operation generation unit of the first embodiment.

Hereinafter, an example of the operation generation will be described using FIG. 5. In FIG. 5, reference numeral 51 denotes an image that was imaged by the camera which is the imaging apparatus 1, reference numeral 52 denotes the screwdriver which is the end effector 3 and which appears in the image, reference numeral 53 denotes the screw which appears in the image, reference numeral 54 denotes the axial direction that was obtained, reference numeral 55 denotes the target position that was detected, and reference numeral 56 denotes a distance between the axial direction and the target position. A flange control amount by which the axial direction and the target position become closer to each other is calculated from this information. Specifically, firstly, by Equation 1 to Equation 4 below, the control amount H' of the control target is solved for.

[EQUATION 1]
$$P' = H \cdot H' \cdot P \tag{1}$$

[EQUATION 2]
$$H' = \begin{bmatrix} 1 & 0 & 0 & dx \\ 0 & 1 & 0 & dy \\ 0 & 0 & 1 & 0 \\ 0 & 0 & 0 & 1 \end{bmatrix} \tag{2}$$

[EQUATION 3]
$$u' = f_x \times P'_x / P'_z + cx \tag{3}$$
$$v' = f_y \times P'_y / P'_z + cy$$

[EQUATION 4]
$$\begin{bmatrix} \frac{\partial u'}{\partial dx} & \frac{\partial u'}{\partial dy} \\ \frac{\partial v'}{\partial dx} & \frac{\partial v'}{\partial dy} \end{bmatrix} \begin{bmatrix} dx \\ dy \end{bmatrix} = \begin{bmatrix} u - u_d \\ v - v_d \end{bmatrix} \tag{4}$$

Here, Equation 1 is an expression that relates the camera which is the imaging apparatus 1, the screwdriver which is the end effector 3, and the screw. P' is the screw position in the imaging apparatus coordinate system 43 which is the control target, H' is a control amount of the screwdriver which is the end effector 3, and P is the screw position in the end effector coordinate system 44 that is made to be the target of control. Equation 2 is a definition of the control amount H' for the screwdriver which is the end effector 3, and this is a case of moving in the x axial direction and the y axial direction of the end effector coordinate system 44. dx and dy express control amounts. Equation 3 is an expression that relates the screw position P' and the image, and u' and v' express a projection position within the image, fx and fy express a focal length of the camera which is the imaging apparatus 1, and cx and cy express a principal point position of the camera which is the imaging apparatus 1. Equation 4 is the Jacobian of the obtained image, and u and v are the detected screw position, and ud and vd are the position of the foot of the perpendicular line below the screw position on the axis. By obtaining these from each image of a stereo camera which is the imaging apparatus 1, a control amount H' for the screwdriver which is the end effector 3 is obtained. This is reflected in the current flange position and orientation Q by Equation 5.

[EQUATION 5]
$$Q' = Q \cdot G \cdot H \cdot H' \cdot H^{-1} \cdot G^{-1} \tag{5}$$

Here, Q' is the flange position and orientation to be obtained, and Q is the flange position and orientation at the time of imaging. By this, it is possible to control the flange position and orientation based on the distance between the target position and the axial direction in the image. The result of this is that the flange position and orientation calculation does not require an accurate three-dimensional position of the target position, and therefore it is possible to reduce the influence of three-dimensional measurement accuracy due to position and orientation calibration error between the two cameras which are the imaging apparatus 1, for example.

(Step S107)

In step S107, the termination determination unit 105 receives the axial direction data and the target position data from the axial direction obtainment unit 102 and the target position detection unit 103, and determines whether to terminate or continue the control loop. Also, the termination determination unit 105 sends the termination determination data to the control unit 106. Here, the control loop is a loop processing sequence, from step S102 to step S109, for controlling the robot arm 2 based on the result of imaging. The termination determination may be made based on the distance between detected axis and the target position, may be made based on the difference between the previous distance and the current distance, and may be made based on the loop count. For example, configuration may be taken to determine "terminate" in the case where the difference between the previous distance and the current distance is a fixed value or less and "continue" otherwise, and configuration may be taken to determine "terminate" in a case where the loop count is a fixed value or more and "continue" otherwise. In the present embodiment, "terminate" is determined in a case where the distance between the axial direction and the target position is a fixed value or less and "continue" is determined in otherwise.

(Step S108)

In step S108, the control unit 106 receives position and orientation data that defines an operation from the operation generation unit 104, and controls the robot arm 2 to move to the received position and orientation.

(Step S109)

In step S109, the control unit 106 receives termination determination data from the termination determination unit 105, and in the case where the termination determination data is "continue", the control unit 106 sends an imaging trigger to the imaging apparatus 1, and returns to step S102. In the case where the termination determination data is "terminate", the control unit 106 advances to step S110.

(Step S110)

In step S110, the control unit 106 executes a task operation. Here, the task operation is controlling the robot arm 2 and the end effector 3 by movement set in advance. The task operation of the present embodiment is an operation for unscrewing the screw in which the screw at the target position is removed by the screwdriver which is the end effector 3. For example, the screwdriver which is the end effector 3 is caused to advance, and after detecting that the screwdriver which is the end effector 3 has contacted the screw by the proximity sensor, the screw is removed by causing the screwdriver to rotate, and then the position and orientation prior to executing the task operation are returned to.

(Step S111)

In step S111, the control unit 106 determines whether to terminate the processing. In the case where there is a next target screw, the control unit 106 returns to step S101. In the case where the task execution has completed for all targets, the processing terminates.

[Effect]

By virtue of the present embodiment, it is possible to realize robot control by visual servoing based on the axial direction and target position in the image. The result of this is that it is possible to reduce a calibration operation load, and to execute a task at high precision even in the case where it is not possible to extract enough features from the image.

[First Variation of the First Embodiment]

The control amount H' for the control target is translated on the x axis and the y axis in the end effector coordinate system 44 by the definition of Equation 2, but limitation is not made to this. The control amount H' may rotate around the x axis or the y axis, and both translation and rotation may be employed.

Figure 6:
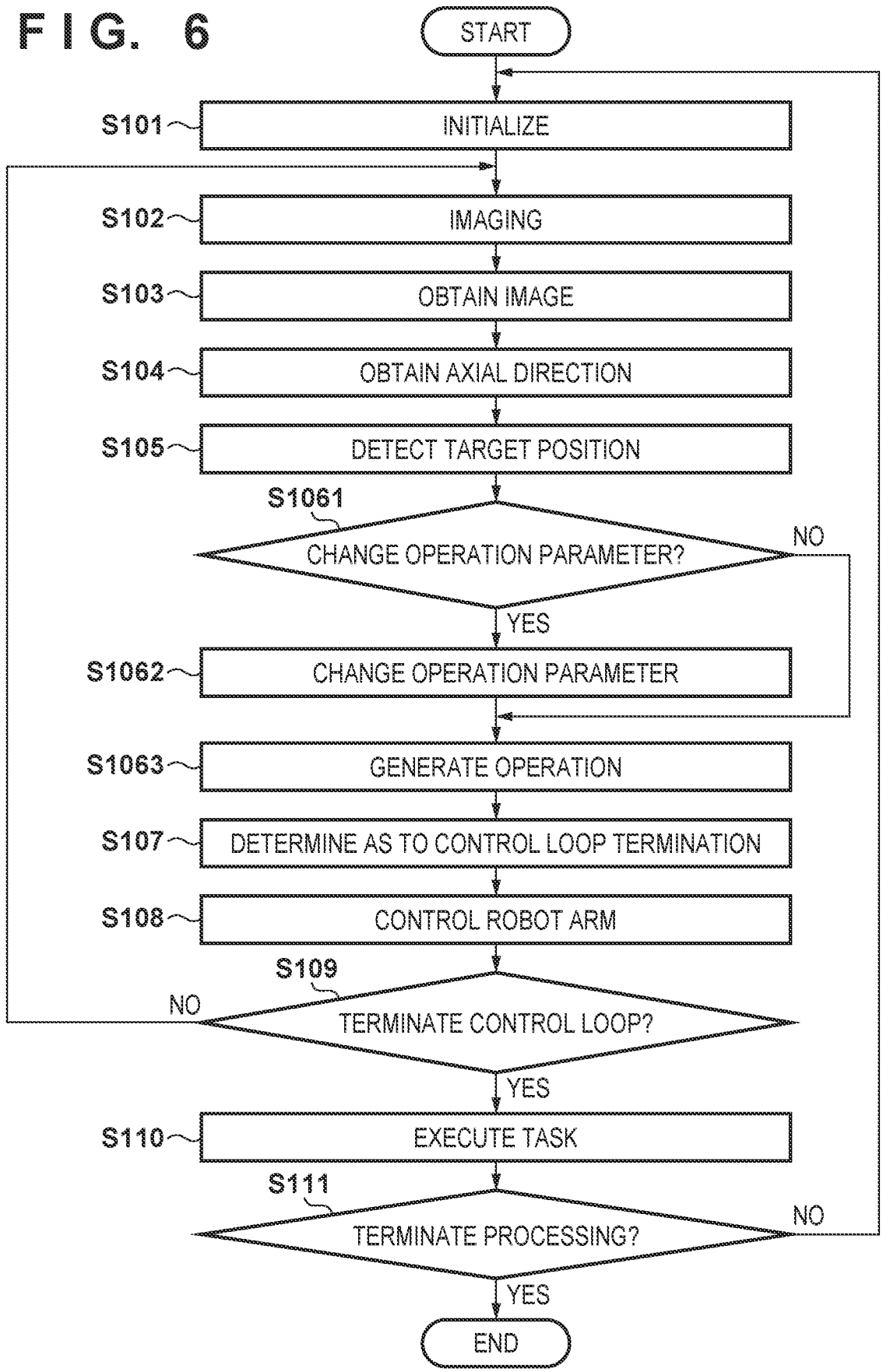
FIG. 6 is a flowchart for describing processing by the robot system of a first variation of the first embodiment.

Hereinafter, the control processing method of the first variation of the first embodiment will be described using the flowchart of FIG. 6. Since step S101 to step S105 and step S107 to step S111 in FIG. 6 are approximately the same as in the first embodiment, they are abbreviated.

(Step S1061)

In step S1061, the operation generation unit 104 receives the axial direction data and the target position data from the axial direction obtainment unit 102 and the target position detection unit 103, and determines whether to change the operation parameters to be generated. Here, the operation parameters are the components of the control target control amount H'. Specifically, these are the translation components in the x axis, the y axis, and the z axis of the control amount H' and the rotational components around the x axis, the y axis, and the z axis. In the case where the operation generation unit 104 determines that an operation parameter is to be changed, the processing proceeds to step S1062, and in the case where it is determined that the operation parameters are not to be changed, the processing proceeds to step S1063. The determination may switch between the change determination and the no-change determination every predetermined number of executions of step S1061, and may switch between the change determination and the no-change determination in a pattern registered in advance, and may be determined based on the detected axial direction and distance to the target position. In the present embodiment, in a case where the distance between the axial direction and the target position is a fixed value or less, a determination for which a change in which a one degree shift is made with respect to the next determination is made. Thereby, visual servoing in which a plurality of operation parameters are combined is possible.

(Step S1062)

In step S1062, the operation generation unit 104 switches a component to be fixed and a component to be changed among the operation parameters. From Equation 2, for the control amount H' prior to the operation generation unit 104 switching the operation parameters, components other than translation components in the x and y axial directions of the end effector coordinate system 44 are zero. For example, when changing the operation parameters so that components other than rotation around the x axis and the y axis of the end effector coordinate system 44 are made to be zero, the control amount H' ends up as Equation 6.

[EQUATION 6]

$$H' = \begin{bmatrix} 1 & 0 & dy & 0 \\ 0 & 1 & -dx & 0 \\ -dy & dx & 1 & 0 \\ 0 & 0 & 0 & 1 \end{bmatrix} \quad (6)$$

As another example, when changing the operation parameters so as to advance a predetermined amount L in the z axial direction of the end effector coordinate system 44, the control amount H' is as in Equation 7.

[EQUATION 7]

$$H' = \begin{bmatrix} 1 & 0 & 0 & 0 \\ 0 & 1 & 0 & 0 \\ 0 & 0 & 1 & L \\ 0 & 0 & 0 & 1 \end{bmatrix} \quad (7)$$

In the present embodiment, in for example the first change determination, the operation parameters are changed so as to advance the distance of $P'_z/2$ in the axial direction of the end effector coordinate system 44. In the second change determination, a change is made so that components other than rotation around the x axis and y axis of the end effector coordinate system 44 are zero.

In the case where the control target or the target position feature cannot be satisfactorily extracted from the image, it is impossible to control translation components and rotational components of the operation parameters simultaneously. However, as in the present embodiment, by executing the translation control, the advancing control, and the rotation control, switching in that order, it is possible to separate the error of the translation component and the error of the rotational component and control them separately. For that reason, visual servoing of the position and orientation can be realized in a case where the control target or the target position feature cannot be extracted satisfactorily from the image.

[Second Variation of the First Embodiment]

The screwdriver which is the end effector 3 is used as the control target and the screw as the target position, but limitation need not be made to this. An adsorption hand may be used as the end effector 3, and a multi-fingered hand may also be used. A gripped part and an assembly target part may also be used as the target position.

Figure 7:
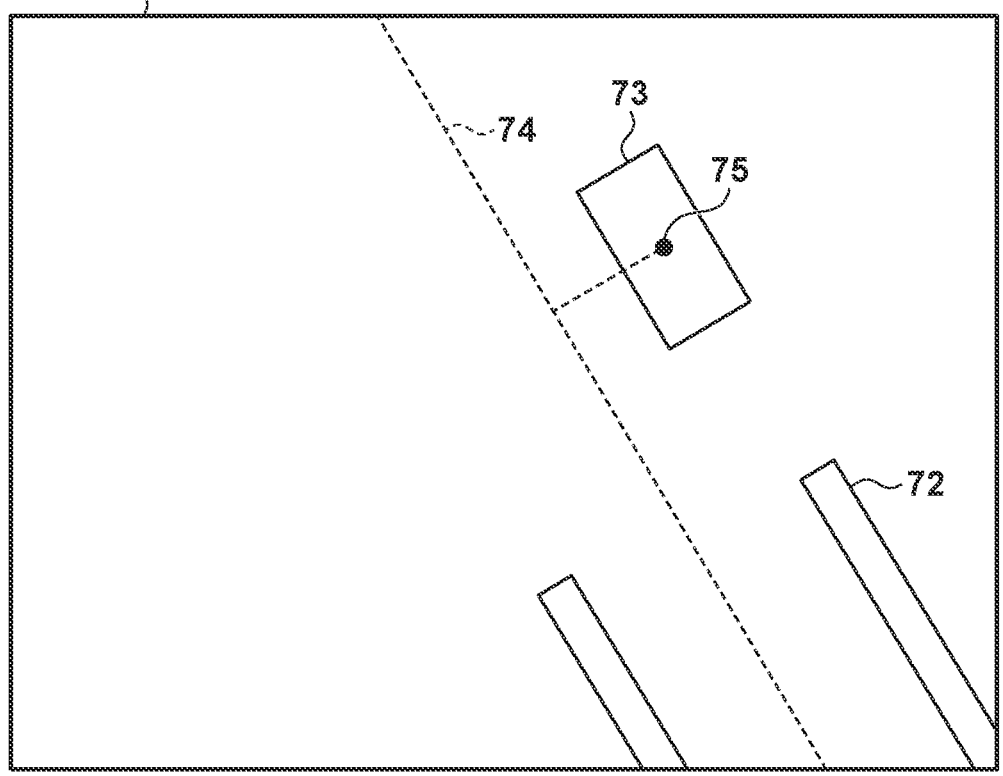
FIG. 7 is a view for describing an operation generation unit of a second variation of the first embodiment.

For example, as with the image 71 imaged by the imaging apparatus 1 of FIG. 7, a multi-fingered hand 72 which is the end effector 3 may be used as the control target, a center line 74 of the multi-fingered hand which is the end effector 3 may be used as the axial direction, and a center position 75 of a gripped part 73 may be used as the target position. Similarly to in the first embodiment, control is performed so that the distance between the axial direction and the target position becomes smaller. After that, it is possible to accurately grip the gripped part by advancing the multi-fingered hand which is the end effector 3, closing it, and then returning it to the original position and orientation.

Figure 8:
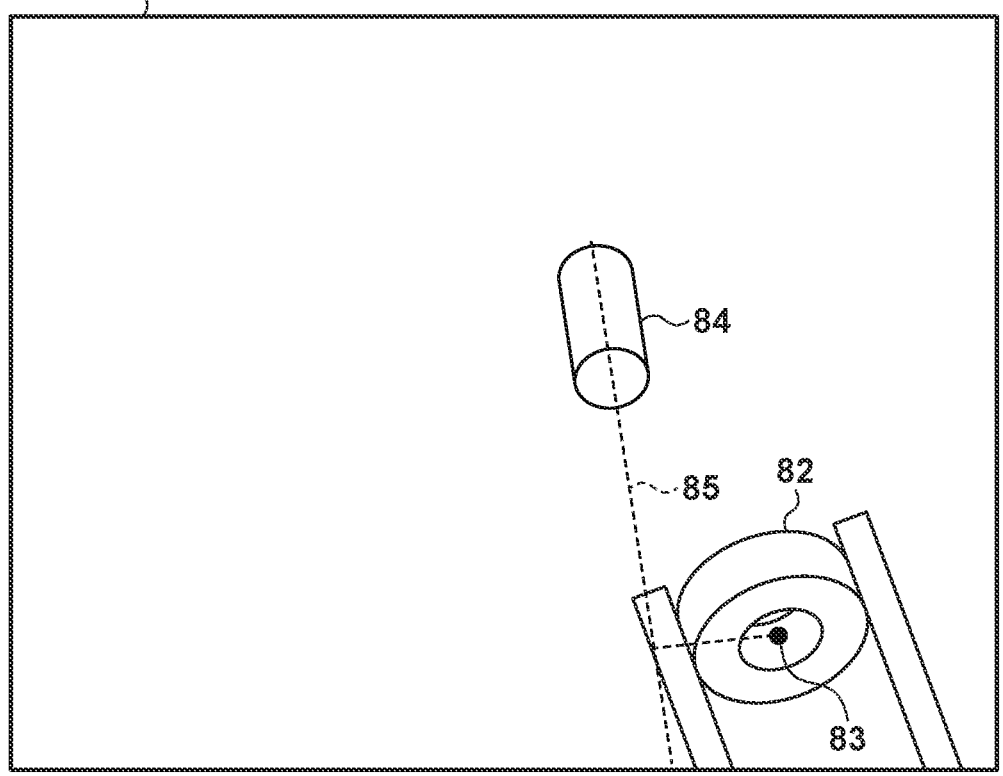
FIG. 8 is a view for describing the operation generation unit of the second variation of the first embodiment.

Also, as another example, a case in which a control target control position and a target axial direction are detected in an image in FIG. 8 will be described (position detection and direction detection). Reference numeral 81 denotes an image that was imaged by the imaging apparatus 1, and reference numeral 82 denotes an assembly component which is a control target that is gripped by a multi-fingered hand which is the end effector 3. Reference numeral 83 denotes a control position at which the center of the assembly component which is the control target is detected, reference numeral 84 denotes an assembly target part, and reference numeral 85 denotes a target axial direction detected based on the assembly target part. Similarly to in the first embodiment, control is performed so that the distance between the axial direction and the control position becomes smaller. After that, by advancing the multi-fingered hand which is the end effector 3, opening it, and then returning it to its original position and orientation, it is possible to accurately execute a task even in a case where the control position is set to the control target, and the axial direction is set for the control target. Note that in the present embodiment, gripping encompasses the concepts of grasping (for example, grabbing and squeezing by a plurality of fingers) and holding (for example using a vacuum-chuck pad or electromagnetic force to suction).

[Third Variation of the First Embodiment]

Figure 9:
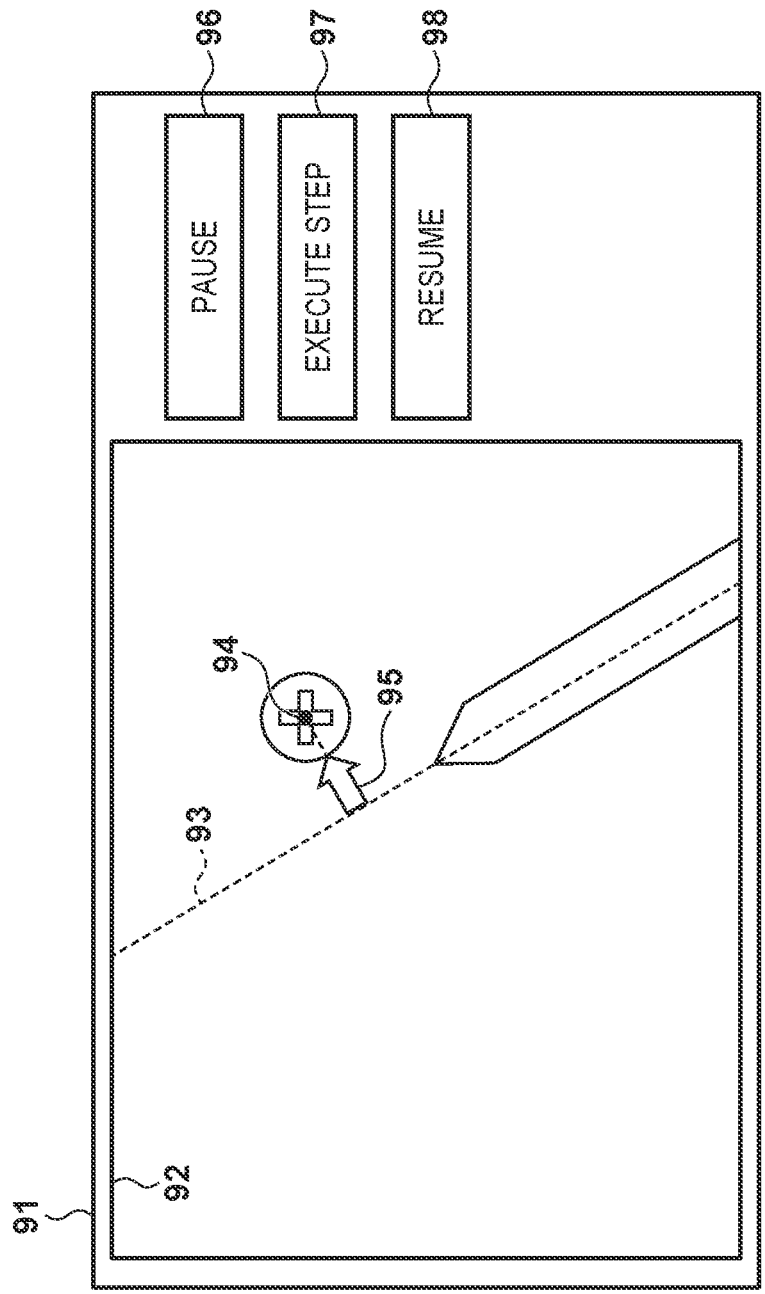
FIG. 9 is a view for describing an operation display unit of a third variation of the first embodiment.

Operation of a robot may be displayed by using an operation display unit (not shown graphically). Hereinafter, an example of an operation display unit will be described using FIG. 9. In FIG. 9, reference numeral 91 denotes a screen of the operation display unit that is presented to the user, reference numeral 92 denotes an image that was received from the image obtainment unit 101, and reference numeral 93 denotes an axial direction received from the axial direction obtainment unit 102. Reference numeral 94 denotes a target position received from the target position detection unit 103, reference numeral 95 denotes a distance in a direction that the axis moves, and reference numeral 96 denotes a pause button that is pressed when stopping the control loop temporarily. Reference numeral 97 denotes a step execution button that is pressed when executing a single control loop, and reference numeral 98 denotes a resume button that is pressed when resuming a paused control loop. A button operation is performed by a UI device (not shown) (for example, a mouse). In FIG. 9, for reference numeral 95, the direction of arrow indicates the direction in which the axis is to move, and the length of the arrow indicates the distance that the axis is to move. However, the distance that the axis is to move may be a numerical value (in actual units or pixel units). Also, the distance that and direction in which the axis is to move may both be displayed and it may be that only one of the two is displayed.

Firstly, the operation display unit receives image data, axial direction data, and target position data from the image obtainment unit 101, the axial direction obtainment unit 102, and the target position detection unit 103, and displays the axial direction and the target position so as to be superimposed on the image. Also, the operation display unit receives position and orientation data from the operation generation unit 104, and displays the direction and distance in which the control target is to move so as to be superimposed. Next, in the case where the user pushes a pause button 96, the control unit 106 pauses control of the robot arm 2. In the case where the user pushes the step execution button 97, the control unit 106 resumes control of the robot, and then, after reaching step S108, once again pauses control of the robot. Finally, when the user presses a resume button 98, the control unit 106 resumes control of the robot.

In this way, by using the operation display unit to display operation of the robot and move it little-by-little while confirming the movement of the robot as well as the detection results, it is possible to complement adjustment of parameters necessary for control and detection and complement analysis of the cause of a problem that occurred.

[Fourth Variation of the First Embodiment]

In step S101, a position and orientation set by instruction work by a teaching pendant are obtained, but it is not necessary to be limited to this. For example, based on the image that is imaged from a bird's-eye view by a stereo camera which is the imaging apparatus 1, the position and orientation may be obtained based on the result of detecting a screw and measuring an approximate three-dimensional position. Alternatively, configuration may be taken to set the position and orientation by a simulator by using a three-dimensional model such as CAD data. Also, configuration may be taken to set a plurality of target positions together with an order in which to execute tasks.

(Second Embodiment)

In the second embodiment, similarly to in the first embodiment, by an imaging apparatus that is attached to a robot, a control target and a target position are imaged, and the control target is guided to the target position. However, the second embodiment is different to the first embodiment in that it comprises a light projection apparatus that projects light and a plane measurement unit that measures, from an image into which the light is projected, a plane in which the screw which is the target is screwed in. By measuring the plane in which the target screw is screwed in, it is possible to realize work of controlling to achieve an determined angle (for example, perpendicular) between the plane and the axial direction. Specifically, it is possible to obtain a target orientation at the target position. By obtaining the target position and the target orientation in this way, and controlling the robot thereby, the robot can apply the screwdriver, which is the end effector, approximately perpendicular to the screw and stably unscrew it. In other words, it is possible to perform the task by the robot stably.

[Apparatus Configuration]

Figure 10:
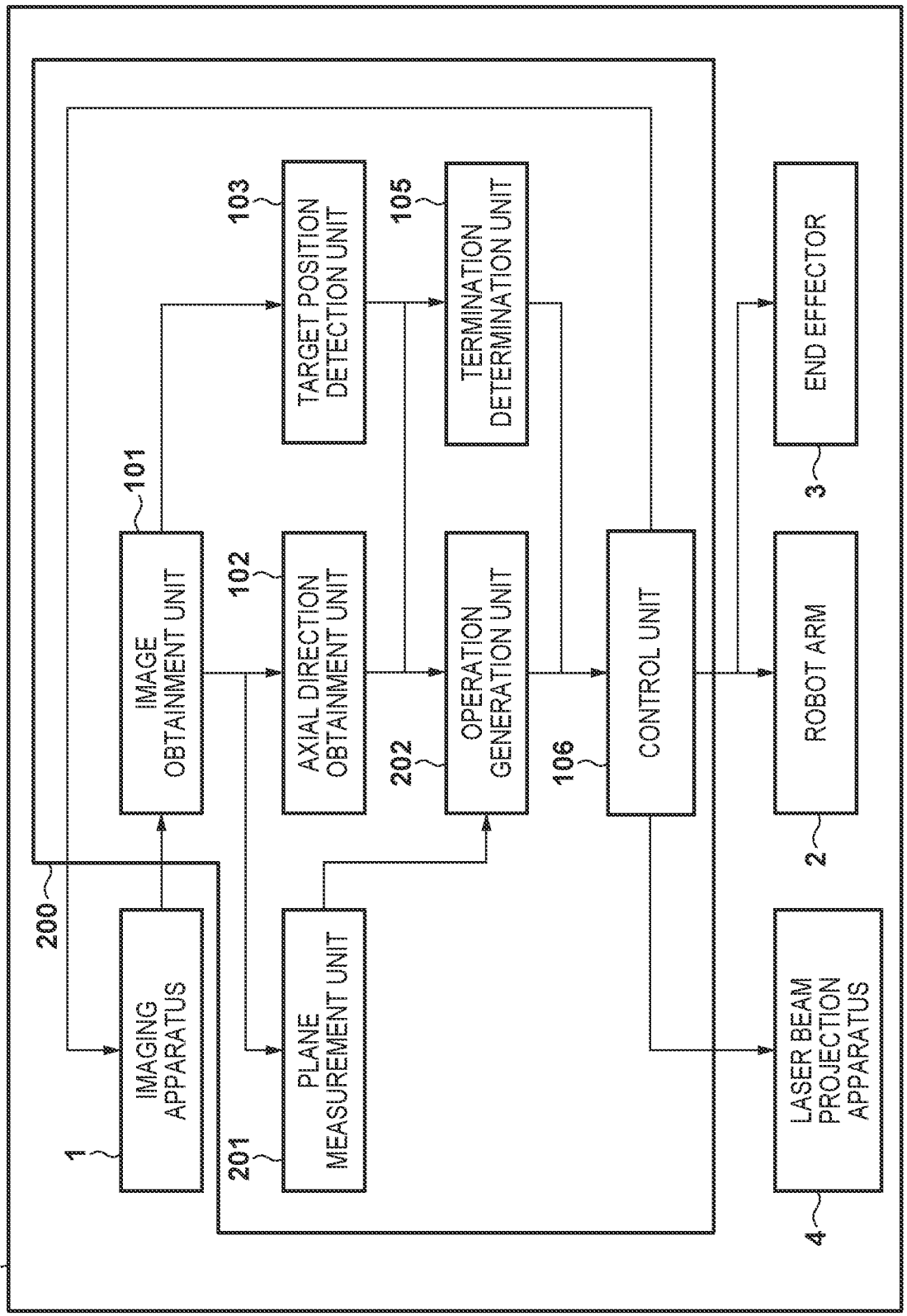
FIG. 10 is a block diagram that illustrates an example of a configuration of the robot system of the second embodiment.

By the block diagram of FIG. 10, an example of an apparatus of a robot system 2000, which comprises a control apparatus 200 of the second embodiment, is illustrated. The robot system 2000 comprises the imaging apparatus 1, the robot arm 2, the end effector 3, a light projection apparatus 4, and the control apparatus 200. Note that since the imaging apparatus 1, the robot arm 2, and the end effector 3 are approximately the same as in the first embodiment, description thereof is abbreviated.

The light projection apparatus 4 is an apparatus for projecting light that results in a feature onto the target of a plane measurement. For example, the light projection apparatus 4 is configured by a crossline laser projector for projecting a cross-shaped line laser beam, and projecting a laser beam in accordance with a projection trigger that is received from the control unit 106.

The control apparatus 200 comprises the image obtainment unit 101, the axial direction obtainment unit 102, the target position detection unit 103, a plane measurement unit 201, an operation generation unit 202, the termination determination unit 105, and the control unit 106. Note that since the image obtainment unit 101, the axial direction obtainment unit 102, the target position detection unit 103, the termination determination unit 105, and the control unit 106 are approximately the same as in the first embodiment, description thereof is abbreviated.

The plane measurement unit 201 receives from the image obtainment unit 101 image data in which the laser beam is projected, detects a three-dimensional normal of the plane based on the image data, and sends data of the target plane (normal line data) to the operation generation unit 202.

The operation generation unit 202, based on the axial direction data, the target position data, and the normal line data received from the axial direction obtainment unit 102, the target position detection unit 103, and the plane measurement unit 201, calculates a position and orientation that define operation of the end portion of the robot arm 2. Then the operation generation unit 202 sends the calculated position and orientation data to the control unit 106.

[Control Processing]

Figure 11:
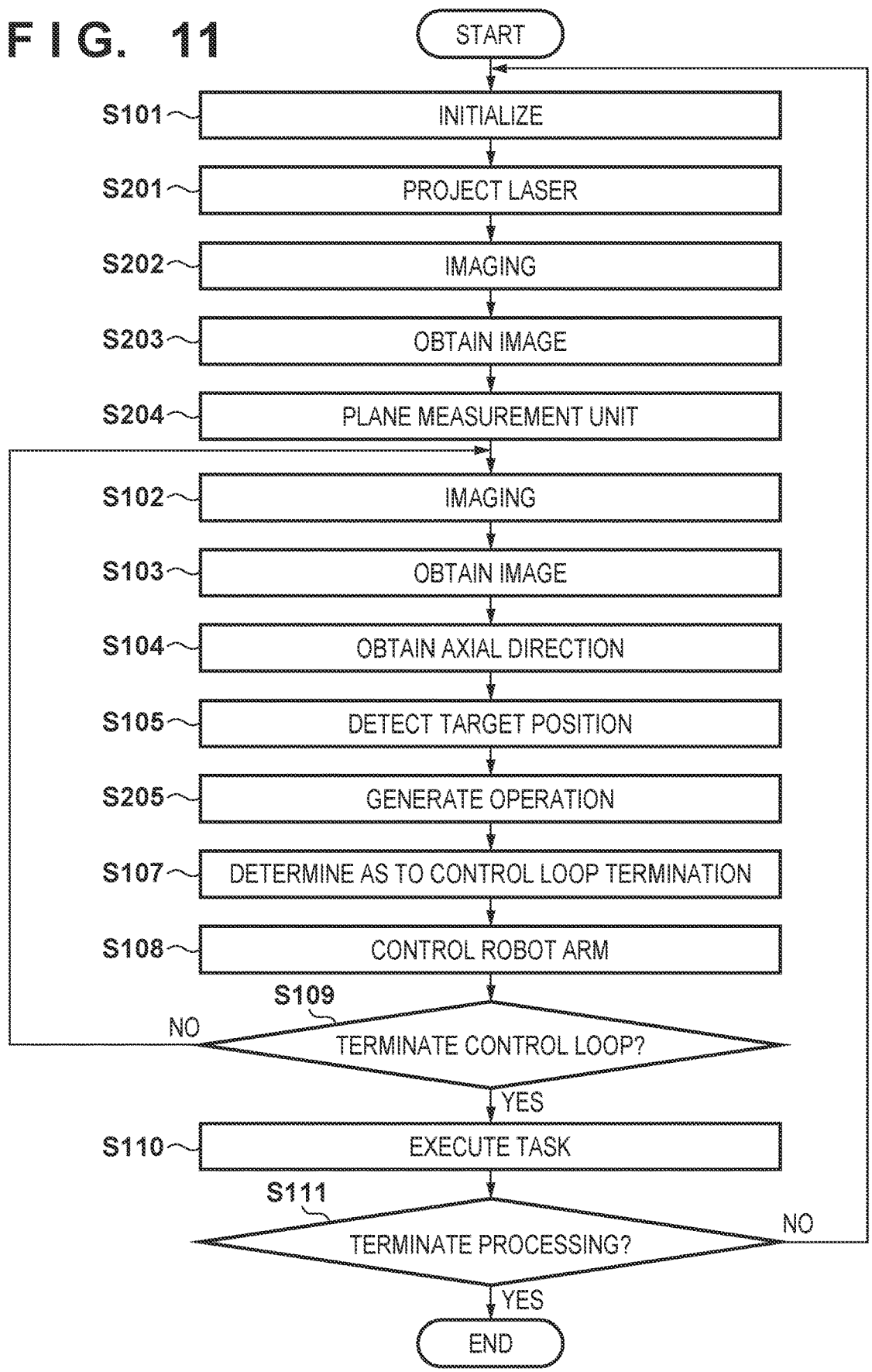
FIG. 11 is a flowchart for describing processing by the robot system of the second embodiment.

A control processing method by the control apparatus 200 and the robot system 2000 of the second embodiment will be described in accordance with the flowchart of FIG. 11. Since step S101 to step S105 and step S107 to step S111 are approximately the same as in the first embodiment, description thereof is abbreviated.

(Step S201)

In step S201, the light projection apparatus 4 receives a projection trigger from the control unit 106, and then projects a laser beam. By this, a plane measurement can be made by a stereo camera, which is the imaging apparatus 1, stably even with a plane that lacks a feature.

(Step S202)

In step S202, the imaging apparatus 1 receives the imaging trigger from the control unit 106, performs imaging, and sends the imaged image signal to the image obtainment unit 101.

(Step S203)

In step S203, the image obtainment unit 101 receives the image signal from the imaging apparatus 1, and sends image data to the plane measurement unit 201.

(Step S204)

In step S204, the plane measurement unit 201 receives image data from the image obtainment unit 101, detects the normal of the plane based on the image data, and sends the normal line data to the operation generation unit 202. Detection of the normal is measurement of a three-dimensional point cloud of a laser region that is projected in for example by stereo matching based on images of the left and the right stereo cameras which are the imaging apparatus 1. The plane measurement unit 201 detects the normal of the plane by calculating a third principal component that is the result of a principal component analysis of the measured three-dimensional point cloud.

(Step S205)

In step S205, the operation generation unit 202 receives the axial direction data, the target position data, and the normal line data from the axial direction obtainment unit 102, the target position detection unit 103, and the plane measurement unit 201, and calculates a position and orientation that define operation of the end portion of the robot arm 2. Also, the operation generation unit 202 sends the position and orientation data to the control unit 106.

Hereinafter, an example of operation generation will be described. In the present embodiment, control is performed so that the axis of the screwdriver, which is the end effector 3, is applied approximately perpendicular in relation to the plane in which the screw is screwed in. When the end effector coordinate system 44 is represented in the robot coordinate system 41, Equation 8 is applied.

[EQUATION 8]

$$H_r = Q \cdot G \cdot H \quad (8)$$

Also, when the plane orientation O measured in the imaging apparatus coordinate system 43 is expressed in the robot coordinate system 41, Equation 9 is applied.

[EQUATION 9]

$$H_P = Q \cdot G \cdot O \quad (9)$$

Since control is performed to line up the screwdriver axis perpendicular to the plane, the position components of the end effector coordinate system 44 are left as are, and the orientation component z axis is made to approximately align with the normal of the plane. The normal of the plane is made to be the target orientation, and a screwdriver position and orientation, which are calculated so that the orientation component z axial direction becomes the target orientation, are made to be the initial position and orientation, and operation generation that is approximately the same as in the first embodiment is performed.

In this fashion, it is possible to perform control so that when the end effector 3 is caused to advance, the axis of the screwdriver which is the end effector 3 is lined up approximately perpendicular to the plane in which the screw is screwed in. Note that in the present embodiment, the plane measurement unit 201 performs plane measurement only once after the initialization of step S101, but it is not necessary to limit to this. The plane measurement unit 201 may perform plane measurement immediately prior to the operation generation in step S205, and the plane measurement unit 201 and the operation generation unit 202 may once again perform plane measurement and operation generation immediately prior to the task execution in step S110.

[Effects]

By virtue of the present embodiment, by performing the plane measurement, it is possible to execute visual servoing so as to control the angle between the axial direction associated with the control target and the plane. As a result, it is possible to realize a task for which the orientation of the control target at the target position is important.

[First Variation of the Second Embodiment]

In step S204, the plane measurement is performed by using the image into which the laser beam is projected, but it is not necessary to limit to this. For example, a pattern in a plane may be used, a pattern may be projected by a projector, and a Depth camera may also be used as the imaging apparatus 1.

(Third Embodiment)

In the third embodiment, similarly to in the first embodiment, by an imaging apparatus that is attached to a robot, a control target and a target position are imaged, and the control target is guided to the target position. However, the third embodiment differs to the first embodiment in that the result of the guidance is reflected in a calibration value. This calibration value is a parameter that represents a position and orientation relationship between the imaging apparatus 1, the robot arm 2, and the end effector 3. While convergence of the visual servoing operation takes longer the larger the error in the calibration value, it is possible to cause a quick convergence by using the method of the present embodiment.

[Configuration of Apparatus]

Figure 12:
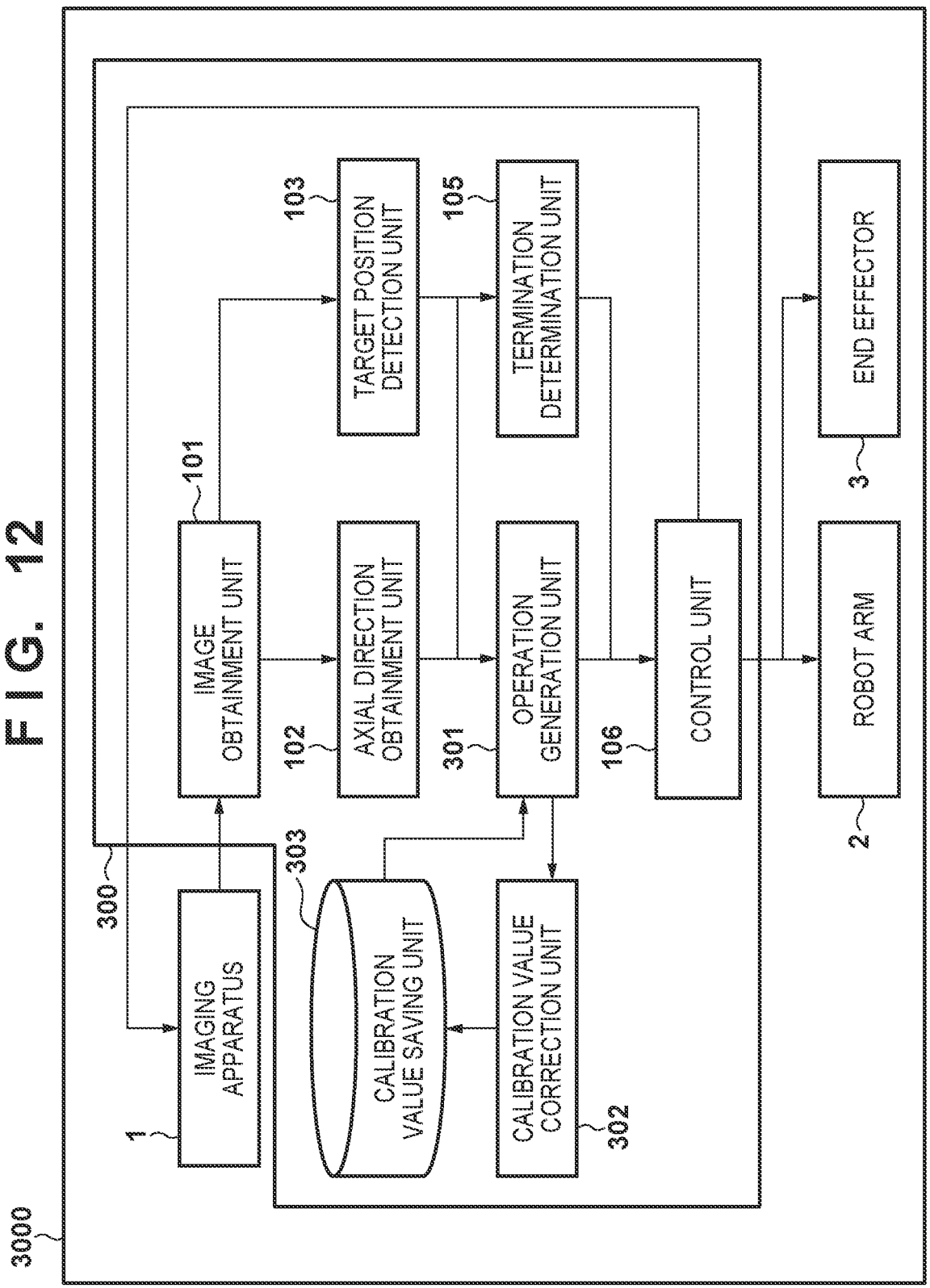
FIG. 12 is a block diagram that illustrates an example of a configuration of the robot system of the third embodiment.

By the block diagram of FIG. 12, an example of an apparatus of a robot system 3000, which comprises a control apparatus 300 of the third embodiment, is illustrated. The robot system 3000 comprises the imaging apparatus 1, the robot arm 2, the end effector 3, and the control apparatus 300. Note that since the imaging apparatus 1, the robot arm 2, and the end effector 3 are approximately the same as in the first embodiment, description thereof is abbreviated.

The control apparatus 300 comprises the image obtainment unit 101, the axial direction obtainment unit 102, the target position detection unit 103, an operation generation unit 301, a calibration value correction unit 302, a calibration value saving unit 303, the termination determination unit 105, and the control unit 106. Note that since the image obtainment unit 101, the axial direction obtainment unit 102, the target position detection unit 103, the termination determination unit 105, and the control unit 106 are approximately the same as in the first embodiment, description thereof is abbreviated.

The operation generation unit 301 calculates a position and orientation that define an operation of the end portion of the robot arm 2 based on the axial direction data, the target position data, and the calibration value received from the axial direction obtainment unit 102, the target position detection unit 103, and the calibration value saving unit 303. Then, the operation generation unit 301 sends the position and orientation data to the control unit 106 and the calibration value correction unit 302.

The calibration value correction unit 302 receives the position and orientation data from the operation generation unit 301, corrects the calibration value, and sends the corrected calibration value to the calibration value saving unit 303.

The calibration value saving unit 303 receives the calibration value from the calibration value correction unit 302 and saves it. Also, the calibration value saving unit 303 sends the calibration value to the operation generation unit 301. The calibration value saving unit 303 is configured by a memory, for example.

[Control Processing]

Figure 13:
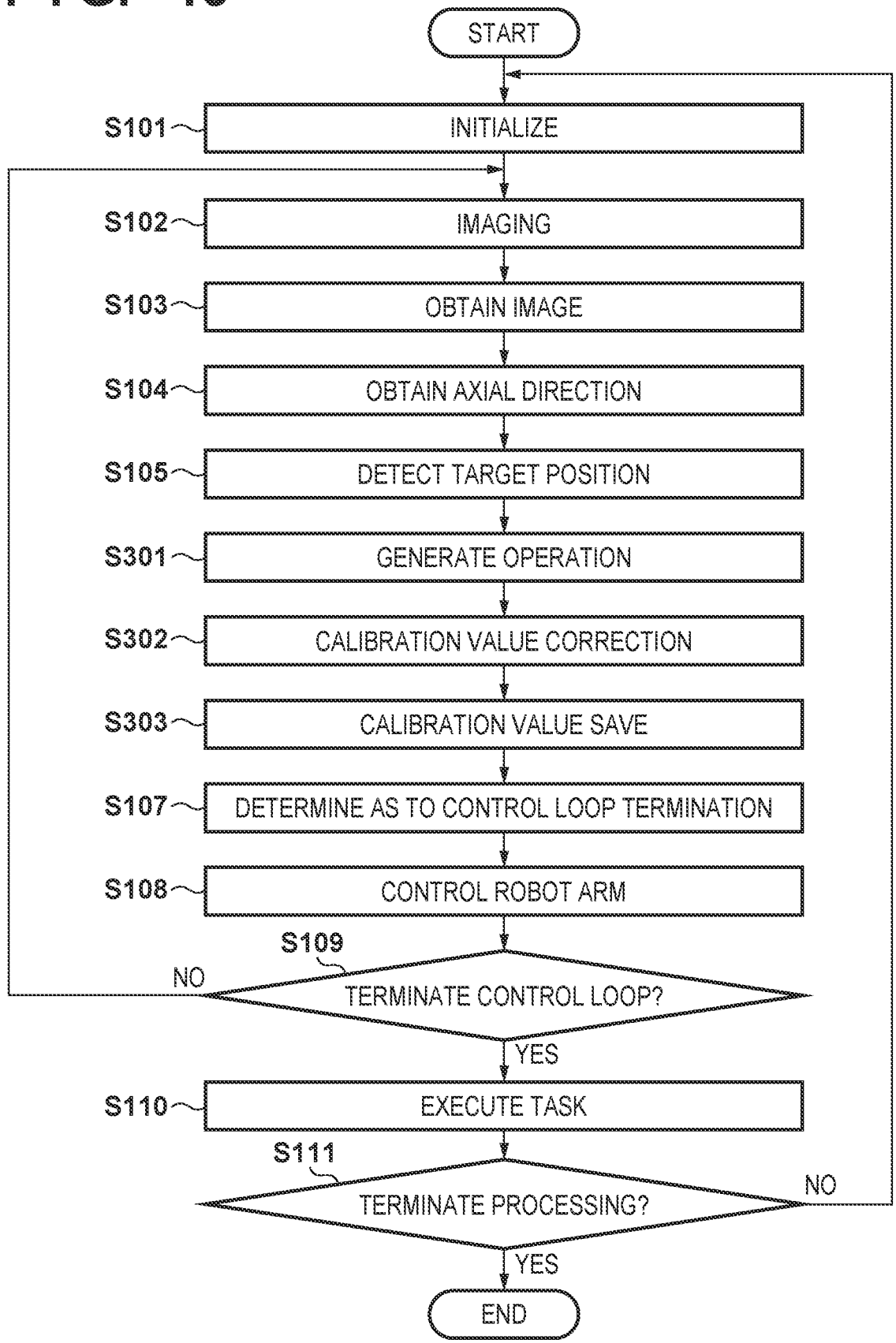
FIG. 13 is a flowchart for describing processing by the robot system of the third embodiment.

A control processing method by the control apparatus 300 and the robot system 3000 of the third embodiment will be described in accordance with the flowchart of FIG. 13. Since step S101 to step S105 and step S107 to step S111 are approximately the same as in the first embodiment, description thereof is abbreviated.

(Step S301)

In step S301, the operation generation unit 301 receives the axial direction data, the target position data, and the calibration value from the axial direction obtainment unit 102, the target position detection unit 103, and the calibration value saving unit 303. The operation generation unit 301 calculates the position and orientation that defines the operation of the end portion of the robot arm 2 in approximately the same way as in the first embodiment by using the received calibration value. Also, the operation generation unit 301 sends the position and orientation data to the control unit 106 and the calibration value correction unit 302.

(Step S302)

In step S302, the calibration value correction unit 302 receives from the operation generation unit 301 the result (position and orientation data) generated by the operation generation unit 301, and corrects the calibration value. Then, the calibration value correction unit 302 sends the corrected calibration value to the calibration value saving unit 303. While the visual servoing is being executed, it is possible to gradually reduce the error by performing a correction of the calibration value. The calibration value that is to be corrected may be a transformation matrix G which represents relatedness of the position and orientation between the end portion of the robot arm 2 and the camera which is the imaging apparatus 1, and may be a transformation matrix H which represents relatedness of the position and orientation between the camera which is the imaging apparatus 1 and the screwdriver which is the end effector 3. The transformation matrix G is corrected in the present embodiment. Assuming that the post-correction transformation matrix is G', based on Equation 5, Equation 10 holds.

[EQUATION 10]

$$Q' \cdot G \cdot H = Q \cdot G \cdot H \cdot H' = Q \cdot G' \cdot H \quad G' = Q^{-1} \cdot Q' \cdot G \tag{10}$$

(Step S303)

In step S303, the calibration value saving unit 303 receives the corrected calibration value from the calibration value correction unit 302 and saves it.

[Effects]

By virtue of the present embodiment, it is possible to gradually reduce the error in the calibration value by correcting the calibration value simultaneously to controlling the control target. The result of this is that it is possible to terminate control more quickly when the next visual servoing execution is performed.

[First Variation of the Third Embodiment]

In step S303, only the calibration value is saved, but it is not necessary to limit to this. For example, a set including the current robot position and orientation and the calibration value may be saved, and a set including an ID of an initial position and orientation that is set by instruction work and the calibration value may be saved. Thereby, even in a case where there is a calibration error that depends on the robot position and orientation, it is possible to reduce the error at each position and orientation.

[Hardware Configuration]

The control apparatuses 100, 200, and 300 illustrated in FIG. 2, FIG. 10, and FIG. 12 can be realized using ordinary PCs (Personal Computers). Computer programs and data for causing a CPU of the PC to execute respective unit functions in the control apparatuses 100, 200, and 300 are stored in a hard disk apparatus. The CPU can load the computer programs and data stored in the hard disk apparatus as appropriate into a memory such as a RAM, and execute the processing by using the computer program and data. As a result of this, the PC can realize a function of the control apparatuses 100, 200, and 300.

[Other: First Variation]

In all embodiments, two grayscale cameras were used as the imaging apparatus 1, but it is not necessary to limit to this. Three or more grayscale cameras may be used, an RGB color camera may be used, and a Depth camera may be used.

[Other: Second Variation]

In all embodiments, a six-axis robot was used as the robot arm 2, but it is not necessary to limit to this. Also an articulated robot or a parallel link robot may be used and a perpendicular robot may be used.

[Other: Third Variation]

In the first embodiment, a proximity sensor was used for detection of contact between the screwdriver which is the end effector 3 and the screw, but it is not necessary to limit to this. Detection may be based on the image, a distance sensor may be used, and a force sensor may be used.

<Effects of Embodiments>

By virtue of the first embodiment, it is possible to realize robot control by visual servoing based on the axial direction and target position in the image. The result of this is that it is possible to reduce a calibration operation load, and to execute a task at high precision even in the case where it is not possible to extract enough features from the image.

By virtue of the second embodiment, by performing the plane measurement, it is possible to execute visual servoing so as to control the angle between the axial direction associated with the control target and the plane. As a result, it is possible to realize a task for which the orientation of the control target at the target position is important.

By virtue of the third embodiment, it is possible to gradually reduce the error in the calibration value by correcting the calibration value simultaneously to controlling the control target. The result of this is that it is possible to terminate control more quickly when the next visual servoing execution is performed.

<Definitions>

Target position means a position at which an end effector executes a task. Axial direction means a line segment in an image which is associated with a control target and is for measuring a position and orientation relationship between the control target and the target position. Here, the task operation is controlling the robot arm 2 and the end effector 3 by movement set in advance. An operation parameter means a component of the control target control amount. Calibration value means a parameter that represents a position and orientation relationship between an imaging apparatus, a robot arm, and an end effector.

By virtue of the present invention, it becomes possible to realize visual servoing and execute a task at high precision even in a case where features cannot be sufficiently extracted from an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-202858, filed Oct. 19, 2017, and No. 2018-182701, field Sep. 27, 2018, which are hereby incorporated by reference wherein in their entirety.

What is claimed is:

1. A control apparatus comprising:
   one or more hardware processors; and
   one or more memories for storing instructions to be executed by the one or more hardware processors, the instructions stored in the one or more memories being executable by the one or more hardware processors to cause the control apparatus to function as:
   an image obtaining unit configured to obtain an image in which (i) a control target, where rotation of the control target can be controlled by a robot, and (ii) a target position that is a recess to which the control target is to be moved are imaged by an imaging apparatus that is attached to the robot;
   a moving direction obtainment unit configured to obtain a moving direction of the control target, the moving direction of the control target being along a rotational axis of the control target;
   a target position detection unit configured to detect the target position in the image;
   an operation generation unit configured (1) to generate an operation, before the control target reaches the target position, for changing a posture of the control target to the posture of the target position, where the target position is present on an extension in the moving direction of the rotational axis of the control target and the moving direction of the rotational axis of the control target and a depth direction of the recess match, and (2) to generate an operation for bringing the control target closer to the target position along the moving direction of the control target whose posture has been changed; and
a control unit configured to control the control target in accordance with the operations generated by the operation generation unit.

2. The control apparatus according to claim 1, further comprising a termination determination unit configured to determine whether or not to terminate control by the control unit based on the moving direction of the control target and the target position.

3. The control apparatus according to claim 1, wherein the operation generation unit switches an operation parameter that is a component of a control amount for the control target based on the moving direction of the control target and the target position, and the operation generation unit generates the operations for the control target in accordance with the switched operation parameter.

4. The control apparatus according to claim 1, further comprising an operation display unit configured to display, superimposed on the image, the target position, the moving direction of the control target, and at least one of a direction in which the axis of the control target is to move or a distance that the axis of the control target is to move.

5. The control apparatus according to claim 1, further comprising a plane measurement unit configured to measure a target plane,
wherein the operation generation unit calculates the depth direction of the recess based on the target plane.

6. The control apparatus according to claim 1, further comprising:
a calibration value storage unit configured to store a calibration value that is a parameter that expresses a position and orientation relationship between the imaging apparatus, a robot arm that the robot comprises, and the control target; and
a calibration value correction unit configured to correct the calibration value based on the calibration value and a result generated by the operation generation unit.

7. The control apparatus according to claim 6, wherein the control target is an end effector that is attached to the robot arm.

8. A control apparatus comprising:
one or more hardware processors; and
one or more memories for storing instructions to be executed by the one or more hardware processors, the instructions stored in the one or more memories being executable by the one or more hardware processors to cause the control apparatus to function as:
an image obtaining unit configured to obtain an image in which (i) a control target, where rotation of the control target can be controlled by a robot, and (ii) a target that is a recess to which the control target is to be moved are imaged by an imaging apparatus that is attached to the robot;
a position detection unit configured to detect from the image a control position that is associated with the control target;
a direction detection unit configured to detect from the image a moving direction along a rotational axis that is associated with the target;
an operation generation unit configured (1) to generate an operation, before the control target reaches the target, for changing a posture of the control target to the posture of the target, where the moving direction of the rotational axis that is associated with the target and a depth direction of the recess match based on the moving direction of the rotational axis that is associated with the target and the control position, and (2) to generate an operation for bringing the control target closer to the target along the moving direction of the rotational axis of the control target whose posture has been changed; and
a control unit configured to control the control target in accordance with the operations generated by the operation generation unit.

9. A robot system comprising:
a control apparatus comprising:
one or more hardware processors; and
one or more memories for storing instructions to be executed by the one or more hardware processors, the instructions stored in the one or more memories being executable by the one or more hardware processors to cause the control apparatus to function as:
an image obtaining unit configured to obtain an image in which (i) a control target, where rotation of the control target can be controlled by a robot, and (ii) a target position that is a recess to which the control target is to be moved are imaged by an imaging apparatus that is attached to the robot;
a moving direction obtainment unit configured to obtain a moving direction of the control target, the moving direction of the control target being along a rotational axis of the control target;
a target position detection unit configured to detect the target position in the image;
an operation generation unit configured (1) to generate an operation, before the control target reaches the target position, for changing a posture of the control target to the posture of the target position, where the target position is present on an extension in the moving direction of the rotational axis of the control target and the moving direction of the rotational axis of the control target and a depth direction of the recess match, and (2) to generate an operation for bringing the control target closer to the target position along the moving direction of the control target whose posture has been changed; and
a control unit configured to control the control target in accordance with the operations generated by the operation generation unit;
the robot; and
the imaging apparatus.

10. A method of operating a control apparatus, the method comprising:
obtaining an image in which (i) a control target, where rotation of the control target can be controlled by a robot, and (ii) a target position that is a recess to which the control target is to be moved are imaged by an imaging apparatus that is attached to the robot;
obtaining a moving direction of the control target, the moving direction of the control target being along a rotational axis of the control target;
detecting the target position in the image;
generating (1) an operation, before the control target reaches the target position, for changing a posture of the control target to the posture of the target position, where the target position is present on an extension in the moving direction of the rotational axis of the control target and the moving direction of the rotational axis of the control target and a depth direction of the recess match, and (2) generating an operation for bringing the control target closer to the target position along the moving direction of the control target whose posture has been changed; and controlling the control target in accordance with the generated operations.

11. A method of operating a control apparatus, the method comprising:

obtaining an image in which (i) a control target, where rotation of the control target is controlled by a robot, and (ii) a target that is a recess to which the control target is to be moved are imaged by an imaging apparatus that is attached to the robot;

detecting in the image a control position that is associated with the control target; detecting in the image a moving direction along a rotational axis that is associated with the target;

generating (1) an operation, before the control target reaches the target, for changing a posture of the control target to the posture of the target, where the moving direction of the rotational axis that is associated with the target and a depth direction of the recess match based on the moving direction of the rotational axis that is associated with the target and the control position, and (2) an operation for bringing the control target closer to the target along the moving direction of the rotational axis of the control target whose posture has been changed; and controlling the control target in accordance with the generated operations.

12. A non-transitory computer-readable storage medium storing a computer program for causing a computer to execute a method of operating a control apparatus, the method comprising:

obtaining an image in which (i) a control target, where rotation of the control target can be controlled by a robot, and (ii) a target position that is a recess to which the control target is to be moved are imaged by an imaging apparatus that is attached to the robot;

obtaining a moving direction of the control target, the moving direction of the control target being along a rotational axis of the control target; detecting the target position in the image;

generating (1) an operation, before the control target reaches the target position, for changing a posture of the control target to the posture of the target position, where the target position is present on an extension in the moving direction of the rotational axis of the control target and the moving direction of the rotational axis of the control target and a depth direction of the recess match, and (2) generating an operation for bringing the control target closer to the target position along the moving direction of the control target whose posture has been changed; and controlling the control target in accordance with the generated operations.

13. A non-transitory computer-readable storage medium storing a computer program for causing a computer to execute a method of operating a control apparatus, the method comprising:

obtaining an image in which (i) a control target, where rotation of the control target is controlled by a robot, and (ii) a target that is a recess to which the control target is to be moved are imaged by an imaging apparatus that is attached to the robot;

detecting in the image a control position that is associated with the control target; detecting in the image a moving direction along a rotational axis that is associated with the target;

generating (1) an operation, before the control target reaches the target, for changing a posture of the control target to the posture of the target, where the moving direction of the rotational axis that is associated with the target and a depth direction of the recess match based on the moving direction of the rotational axis that is associated with the target and the control position, and (2) an operation for bringing the control target closer to the target along the moving direction of the rotational axis of the control target whose posture has been changed; and controlling the control target in accordance with the generated operations.

14. The control apparatus according to claim 1, further comprising an estimation unit configured to estimate a plane including the target position using a stereo camera, wherein a depth direction of the recess is based on a normal line direction of the plane.

* * * * *